No. 770,351. PATENTED SEPT. 20, 1904.
M. O. CARTER.
COTTON CHOPPER AND CULTIVATOR.
APPLICATION FILED OCT. 26, 1903.
NO MODEL.
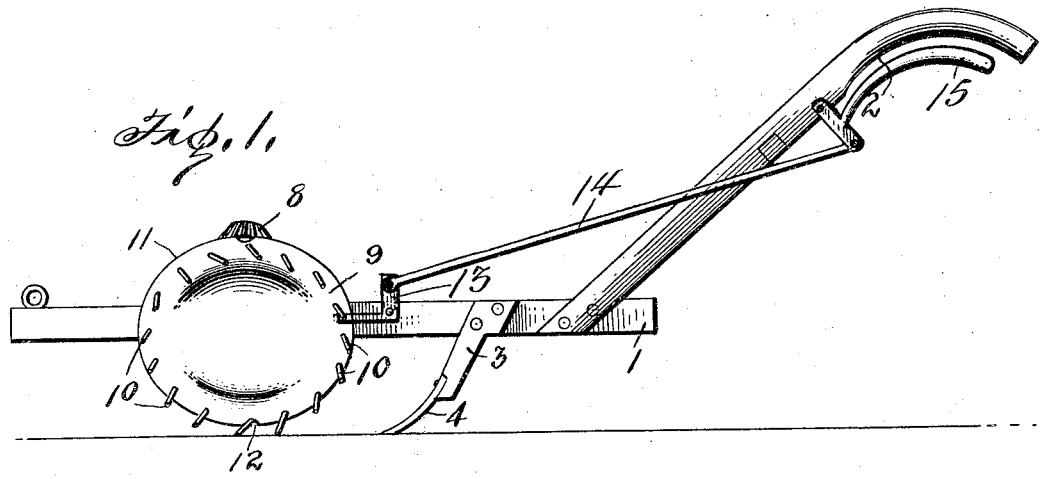
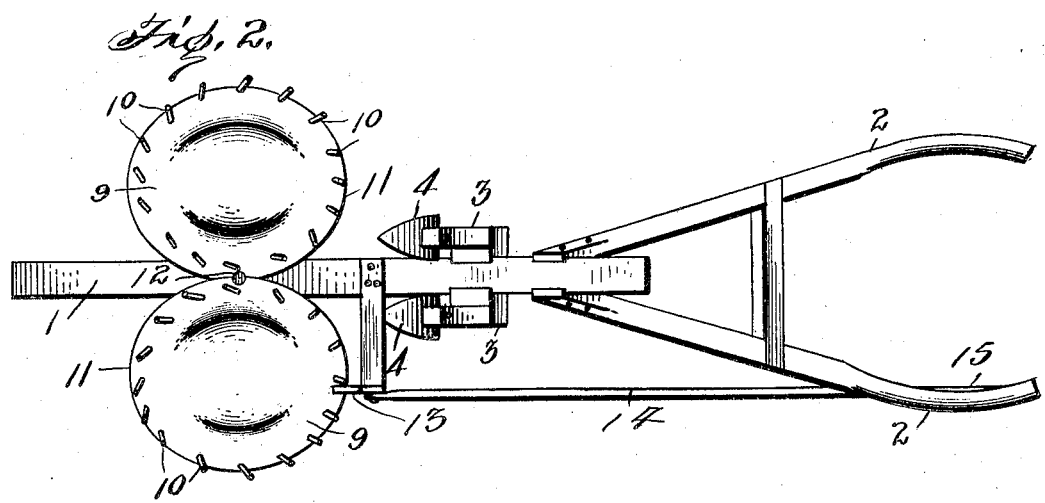
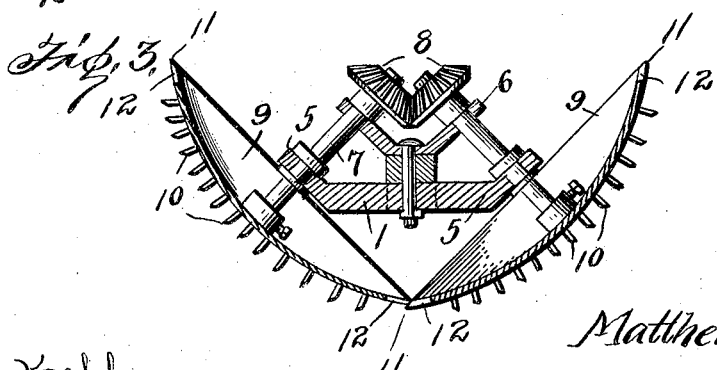
Witnesses
Jas. A. Koehl.
Inventor
Matthew O. Carter
By H. B. Wilson
Attorney No. 770,351. Patented September 20, 1904.

UNITED STATES PATENT OFFICE.

MATTHEW O. CARTER, OF BATSON, SOUTH CAROLINA.

COTTON CHOPPER AND CULTIVATOR.

SPECIFICATION forming part of Letters Patent No. 770,351, dated September 20, 1904.

Application filed October 26, 1903. Serial No. 178,601. (No model.)

*To all whom it may concern:*

Be it known that I, MATTHEW O. CARTER, a citizen of the United States, residing at Batson, in the county of Greenville and State of South Carolina, have invented certain new and useful Improvements in Cotton Choppers and Cultivators; and I do declare the following to be a full, clear, and exact description of the invention, such as will enable others skilled in the art to which it appertains to make and use the same.

This invention relates to a combined cotton chopper and cultivator; and it consists of the features of construction and combination of parts hereinafter described and claimed.

The object of the invention is to provide an implement of this character which when drawn along the field will cut down grass and weeds and thin out the cotton in an effective manner and then throw up the earth around the standing cotton.

In the accompanying drawings, Figure 1 is a side view of a cotton chopper and cultivator embodying my invention. Fig. 2 is a bottom plan view of the same, and Fig. 3 is a vertical cross-section.

Referring now more particularly to the drawings, the numeral 1 represents the main beam of my improved cotton chopper and cultivator, to the rear end of which are attached handles 2 and standards 3, the latter carrying cultivator-shovels 4, which are adapted when the implement is in operation to throw the earth about the thinned-out plants. The beam 1 is provided in advance of the standards with laterally-projecting offsets or brackets 5, which curve or incline upwardly and outwardly at an angle. Supported by the beam is a bearing-plate 6, whose ends also project laterally beyond the sides of the beam and conform to the curvature or angular disposition of the said brackets 5. Journaled in the brackets 5 and bearing-plate 6 are shafts 7, which extend at a diagonal angle, as shown, and are provided at their upper ends with intermeshing beveled gears 8. To the lower ends of the shaft are connected disks 9, which are disposed reversely to the said shafts 7, but at a diagonal angle to the beam and project below the beam, with their edges arranged to come in close contact or to overlap, as illustrated in Fig. 3. The disks 9 are provided upon their under side with spurs or prongs 10, which when the implement is in motion strike the ground and impart rotary motion to said disks, the pinions 8 causing both disks to turn in unison and at a like rate of speed, as will be readily understood. The edges of the disks are beveled to form cutters 11 and are notched, as at 12, at determined points, so as to break the continuity of said cutting edges, these notches 12 being so disposed that in the operation of the disks the mating notches of the disks will simultaneously register at a point coincident with the transverse line of their axes and permit a stalk or hill of cotton to enter and be protected from the cutting-surfaces, so that at predetermined intervals or distances in the path of movement of the device certain hills will be thinned out, while others will be received within the notches and will be protected from the cutting edges and allowed to remain standing. The shovels 4 are so arranged as to come on opposite sides of the standing plants and throw the dirt toward the same in the usual way.

In operation the implement is drawn across the field, and the cutting-disks 9 as they rotate cut out the grass and weeds and also cut down certain plants in the row to permit other plants to remain standing, the operation being effected in this manner and the notches in the disks serving to protect other plants from being cut down, so that certain hills of cotton will be allowed to stand at regular intervals or distances along the length of the row. The spurs 10 not only effect the rotation of the cutters, but serve also to throw the cut-down weeds and grass outwardly from the row.

Pivoted to the beam or to an extension therefrom is a pivoted bell-crank stop or detent 13, one arm of which may be projected into the path of any one of the spurs 10 on one of the disks, and connected to the other arm of said brake or detent is a rod 14, leading to an operating-lever 15, disposed upon one of the stilts or handles 2. This construction of stop or detent permits of the rotation of the disks being arrested when it is desired to save any individual plants where the plants stand irregularly in the row.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A cotton-chopper having a beam and divergent cutting-disks supported therefrom, said disks being set obliquely to said beam and having outwardly-projecting spurs to engage the ground-surface to rotate the disks, the cutting portions of the disks being interrupted at determined points to permit plants at intervals throughout the row to stand, substantially as described.

2. A cotton-chopper having a beam and divergent cutting-disks supported therefrom, said disks being set obliquely to said beam and having outwardly-projecting spurs to engage the ground-surface to rotate the disks, the cutting portions of the disks being interrupted at determined points to permit plants at intervals throughout the row to stand, a stop adapted to be projected into the path of the spurs to arrest the rotation of the disks, and means for projecting and retracting said stop, substantially as described.

In testimony whereof I have hereunto set my hand in presence of two subscribing witnesses.

MATTHEW O. CARTER.

Witnesses:
J. L. WATSON,
J. E. WATSON.